United States Patent

[11] 3,619,287

[72] Inventor Anthony J. Stankavich
Syracuse, N.Y.

[21] Appl. No. 761,184
[22] Filed Sept. 20, 1968
[45] Patented Nov. 9, 1971
[73] Assignee Carrier Corporation
Syracuse, N.Y.

[54] PROCESS OF PRODUCING AN ELECTRICAL RESISTOR
3 Claims, 2 Drawing Figs.

[52] U.S. Cl. .......... 117/227,
117/123, 117/124, 117/160, 117/229, 252/514,
106/1

[51] Int. Cl. .......... C23c 17/00,
C04b 41/14

[50] Field of Search .......... 117/217,
227, 124 B, 160, 229; 252/514; 106/1

[56] References Cited

UNITED STATES PATENTS

| | | | |
|---|---|---|---|
| 3,347,799 | 10/1967 | Wagner | 252/514 |
| 3,385,799 | 5/1968 | Hoffman | 252/514 |

*Primary Examiner*—William L. Jarvis
*Attorneys*—Herman Seid and Harry G. Martin, Jr.

ABSTRACT: An electrical resistance element particularly adapted for use in precision potentiometers and related applications wherein the high temperature resistant and essentially electrically nonconductive base has fused thereon a resistance material comprised of powdered glass and metal resinate suitably treated and admixed with precious metal powders with which in the mixing process is combined an organic vehicle preferably provided by ethyl cellulose dissolved in an alcohol exemplified by 1-undecanol or 1-decanol or equivalents thereof. The instant invention as applied to a ceramic substrate assures uniformly successful results in the printing process, and among other advantages contributes significantly to increased shelf life for the material being applied.

INVENTOR.
ANTHONY J. STANKAVICH
BY B. J. Claboe
ATTORNEY.

PROCESS OF PRODUCING AN ELECTRICAL RESISTOR

BACKGROUND OF THE INVENTION

It is known in the art to provide resistor pastes for application by screen printing or like techniques to a base typified by a ceramic substrate. An exemplary procedure is to first prepare a glass-metal resinate by coating glass in particulate form with precious metals such as gold, iridium, ruthenium and rhodium. The glass-metal resinate may then be blended with other precious metals in powdered form, and suitable for this purpose are palladium and silver. The next step in a typical process is to mull the described mixture with an organic vehicle to form a paste having a viscosity suitable for screen printing upon the ceramic substrate or by other modes of application.

However, it has been found after substantial experience that at least two problems are presented, which in production operations have detracted from the commercial success of the process described. First, it has been noted that the prior art organic vehicles when compounded with the other ingredients tend to, in production runs, dry out on the screen or lose other desirable screening characteristics. Second, the volatile liquid carriers previously employed have resulted in a viscosity of the paste lower than that desired, with the consequence that the solid particles in the paste tend to settle out, and the paste accordingly has a relatively short shelf life.

SUMMARY OF THE INVENTION

The present invention is directed particularly to a method of preparation of a resistor paste utilizable in the production of electrical resistance elements designed for such exemplary applications as potentiometers. In the process to be disclosed in further detail hereinafter, a glass-metal resinate made from powdered glass and a combination of precious metals is mixed with powders of other precious metals, and is then mulled with a novel vehicle preferably comprised of ethyl cellulose and a straight chain alcohol particularly selected for its properties of relatively low vapor pressure, relatively high viscosity, low affinity for moisture, and the further important property of being capable of essentially complete volatilization upon heating so that there is little, if any, carbonaceous residue. Extremely good results have been obtained to date when the alcohol is either 1-undecanol or 1-decanol.

DESCRIPTION OF THE PREFERRED EMBODIMENT

Figures 1, 2:
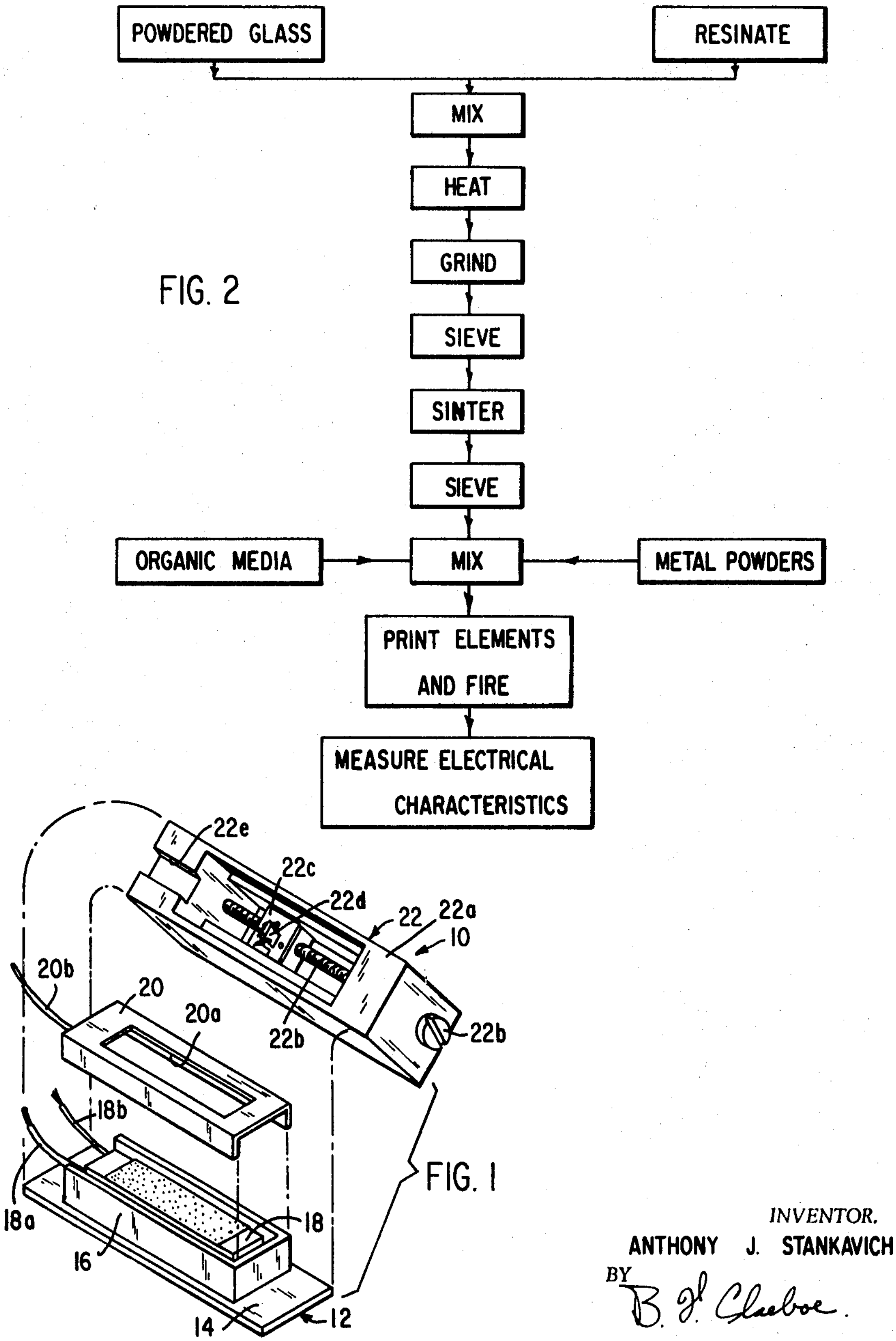
FIG. 1 is an exploded perspective view illustrating one application for the present invention.
FIG 2 is a flow diagram illustrating a preferred process for practicing the novel concepts of this invention.

Thick film resistor pastes find numerous uses in the manufacture of electrical components typified by capacitor electrodes, conductors and resistors. A particularly important application for resistance elements is in precision potentiometers, whether they be of the linear, fixed or rotary type. An illustrative structure embodying the novel concepts of this invention is portrayed in FIG. 1, and a linear potentiometer as shown therein is designated in its entirety by the numeral 10. The potentiometer 10 may comprise a base member 12 constructed to include a support portion 14 mounting in directly affixed relation thereto a casing 16 which slidably receives for attachment by glue or like means a resistance element 18 to which are directed leads 18*a* and 18*b*.

The potentiometer 10 further includes an intermediate portion or collector strip 20 of channel-shape configuration when viewed in cross section having a longitudinally extending opening 20*a* formed therein, which when the potentiometer is assembled, provides exposure to coating *C* on the resistance element 18. As also appears in FIG. 1, the collector strip or buss bar has wired thereto a connection or lead 20*b*. Constructed for location in surmounting relation to the base member 12, the resistance element 18 received therein, and the collector strip is a wiper housing 22.

The housing 22 embodies a body portion 22*a* threaded at opposite ends to receive screw means 22*b* mounting for movement therealong a wiper member 22*c* equipped with a blade or like device 22*d*. The body portion 22*a* is desirably grooved as at 22*e* to accommodate the leads 18*a*, 18*b* and 20*b* when the parts comprising the assembly 10 are attached one to the other by suitable fastening means. Since the elements of the assembly as thus far described, with the exception of the resistance member 18 and the coating *C* thereon, are known to the art, further explanation is believed unnecessary.

While the resistance element 18 and the coating *C* thereon may be produced by various processes, a preferred approach to follow is that outlined in the flow diagram of FIG. 2. A first step in the method of this invention is to admix a predetermined quantity of a lead borosilicate glass with a precious metal resinate solution made up of a combination of gold, rhodium, ruthenium and iridium. The glass desirably is of the high melting point type, becoming molten at about 800° C., and is ball milled with methanol or other carrier for a sufficient period of time to pass a 325 mesh sieve. Typically, the glass and metal resinate admixture may comprise about 795.60 grams of glass, 187.20 grams of gold resinate, 93.60 grams each of rhodium and ruthenium resinates, and 30.60 grams of iridium resinate.

The glass-metal resinate mixture after blending is heated to about 400° F. for approximately 45 minutes and after cooling is ground or crushed for about 60 minutes until the majority of the resultant particles are less than one-sixteenth of an inch in diameter. The particles obtained are then sieved on a 325 mesh screen, the particles which pass therethrough are heated or sintered for about 40 minutes at approximately 840° F., and then resieved.

At this stage of the process it has been conventional to combine the glass-metal resinate with a volatile liquid carrier, and to add one or more precious metals. A common organic carrier is butyl carbitol acetate; however, compounds of this character suffer from several disadvantages, the foremost of which is the inability of the glass-resinate mixture when formulated with the organic carrier and additional precious metals to "lay down" during the screening process. This prime deficiency of prior art organic vehicles is believed to be attributable to the relatively low viscosity of the suspension media heretofore employed, coupled with a rather high vapor pressure and a high level of moisture absorption. Further, many of the organic vehicles heretofore utilized produce during the firing operation carbonaceous residues which result in variations in the resistivity values of the coated cermet elements within the length or circumference thereof.

To obviate these shortcomings, a novel organic media or volatile liquid carrier is employed in the process portrayed in FIG. 2. The vehicle preferably comprises polyvinyl alcohol or ethyl cellulose, the latter being presently preferred, dissolved in straight chain alcohol exemplified by 1-undecanol or 1-decanol or equivalents thereof. A typical formulation for the organic media is about 30 grams of ethyl cellulose of the low viscosity type in 180 grams of undecyl alcohol, the former desirably being added in at least two measured amounts to the solvent with stirring and the dispersion heated at about 150° F. for three to four hours. The organic media, after cooling, is then combined with the glass-resinate solution as previously prepared and these materials are mixed in the general proportions of about 180.00 grams glass-resinate material, 14.82 grams silver powder, 5.18 grams palladium powder and 70 grams organic vehicle. The mixture is then mulled and subjected to a blending operation for approximately three minutes.

The product obtained by the procedures thus far described is next applied to a siliceous base, designated at 18 in FIG. 1. The base or substrate is desirably a ceramic, and preferred materials are steatite, fosterite, sintered or fused aluminas and zircon porcelains. Screen printing or like techniques are employed to apply the mixture to the substrate, and a typical firing cycle for fusing to the ceramic the product described in the preceding paragraph is from about 15 to 20 minutes at a temperature in the range of approximately 1,400° to 1,800° F. Naturally, a furnace may be utilized having stepped temperature zones therein and the speed of travel of the coated element through the oven is controlled to assure a firm bond.

Subsequent to the printing and firing step portrayed in FIG. 2, measurements are made of the electrical characteristics to assure effective performance of the coated cermet element when installed in a production environment of the character shown in FIG. 1. Utilizing known analytical techniques, it has been found that a resistance element as produced in accordance with this invention possesses a resistance per square of up to about 200,000 ohms, a resistance tolerance of approximately ±5 percent, a temperature coefficient of ±0.000050 ohms per ohm per degree C., and a power dissipation of about 40 watts per square inch of resistance surface area. Also characterizing the resistance element as herein provided are the properties of fulfilling an operating temperature range with −55° C. to +125° C. and a resistance linearity of 1.0 percent when divided by element length in inches.

Of equal importance, a resistance element 18 having a coating *C* thereon overcomes the disadvantages of prior art materials by reason of better screening properties and a much longer shelf life. The vapor pressure of the alcohol employed is not more than 0.01 mm. Hg at 25° C., and the organic media has a relatively high viscosity, a low affinity for moisture, and when fired on the ceramic base, there is essentially complete volatilization of the vehicle with the result that carbonaceous residue is substantially absent.

Various modifications may of course be practiced in the formulations and process steps herein disclosed without departing from the spirit of the invention or the scope of the subjoined claims.

I claim:

1. A process of making an electrical resistance element which comprises the steps of forming an intimate, finely divided powdered mixture of glass and metal; forming an organic media consisting essentially of the named components by dissolving a material selected from the group consisting of ethyl cellulose and polyvinyl alcohol in a straight chain alcohol selected from the group consisting of 1-undecanol and 1-decanol; blending the intimate mixture of finely divided powdered metal and glass into said organic media to produce a mixture of printable viscosity having a relatively low vapor pressure and a low affinity for absorption of moisture; printing said mixture on a ceramic base in a pattern of predetermined dimension; heating the mixture on the ceramic base to decompose and drive off the organic media and to simultaneously bond the metal and glass mixture to said ceramic base to form a resistance element.

2. A process of making an electrical resistance element as defined in claim 1 wherein the glass comprises a lead borosilicate glass and wherein said metal essentially consists of a metal selected from the group consisting of gold, iridium, ruthenium and rhodium.

3. A process of making an electrical resistance element as defined in claim 1 including the step of additionally blending a particulate precious metal from the group consisting of silver and palladium into the organic media.

* * * * *